United States Patent
Vandeven

(10) Patent No.: US 8,146,335 B2
(45) Date of Patent: Apr. 3, 2012

(54) SENSOR FOR A HEADER HEIGHT CONTROL SYSTEM

(75) Inventor: Michael L. Vandeven, Leclaire, IA (US)

(73) Assignee: Deere & Company, Moline, IL (US)

( * ) Notice: Subject to any disclaimer, the term of this patent is extended or adjusted under 35 U.S.C. 154(b) by 103 days.

(21) Appl. No.: 12/776,115

(22) Filed: May 7, 2010

(65) Prior Publication Data

US 2011/0271653 A1 Nov. 10, 2011

(51) Int. Cl.
- A01D 41/14 (2006.01)
- A01D 46/08 (2006.01)
- A01D 75/28 (2006.01)

(52) U.S. Cl. .................................................. 56/10.2 E
(58) Field of Classification Search ............... 56/10.2 E, 56/DIG. 10, DIG. 3, 10.2 R, DIG. 15, 208; 172/4
See application file for complete search history.

(56) References Cited

U.S. PATENT DOCUMENTS

| | | | | |
|---|---|---|---|---|
| 3,163,974 | A * | 1/1965 | Mack .......................... | 56/10.2 E |
| 3,611,286 | A * | 10/1971 | Cleveland ..................... | 340/436 |
| 3,886,718 | A * | 6/1975 | Talbot ............................. | 56/208 |
| 3,925,971 | A | 12/1975 | Goering et al. | |
| 3,953,959 | A | 5/1976 | Decruyenaere | |
| 4,211,057 | A * | 7/1980 | Dougherty et al. ......... | 56/10.2 E |
| 4,315,395 | A | 2/1982 | Randall et al. | |
| 4,723,608 | A * | 2/1988 | Pearson ........................ | 172/430 |
| 5,090,184 | A * | 2/1992 | Garter et al. ................ | 56/10.2 E |
| 5,115,628 | A * | 5/1992 | Garter et al. ................ | 56/10.2 E |
| 6,202,395 | B1 | 3/2001 | Gramm | |
| 6,289,659 | B1 * | 9/2001 | Fox ............................. | 56/10.2 E |
| 6,516,595 | B2 * | 2/2003 | Rhody et al. ................ | 56/10.2 E |
| 6,530,197 | B1 * | 3/2003 | Christensen et al. ....... | 56/10.2 E |
| 6,588,187 | B2 * | 7/2003 | Engelstad et al. .......... | 56/10.2 E |
| 6,883,299 | B1 | 4/2005 | Gramm | |
| 7,222,474 | B2 * | 5/2007 | Rayfield et al. ............. | 56/10.2 E |
| 7,730,700 | B2 * | 6/2010 | Nathan et al. ............... | 56/10.2 E |
| 2002/0069628 | A1 | 6/2002 | Metzger | |

FOREIGN PATENT DOCUMENTS

| | | |
|---|---|---|
| EP | 1911342 | 6/2008 |
| GB | 1182842 | 3/1970 |
| GB | 1471971 | 4/1977 |

OTHER PUBLICATIONS

European Search Report, Aug. 24, 2011, 6 pgs.

* cited by examiner

Primary Examiner — Arpad Fabian-Kovacs

(57) ABSTRACT

A header height sensor (102) for an agricultural harvester has an elongate sensor arm (112), a reversing joint (114) and a rotary sensor (116) mounted to a bracket (106) that is fixed to a plastic point (100) of a harvesting head. The bracket is configured to be fixed to the plastic point (100), and is also configured to support an upper portion of the reversing joint (114) for relative rotational movement about a laterally extending longitudinal axis (196). The rotary position sensor (116) is coupled to bracket 106 and coupled to reversing joint (114) such that movement of the reversing joint (114) with respect to the rotary position sensor (116) causes an electrical signal from rotary position sensor (116) to change as a function of the relative rotation.

13 Claims, 4 Drawing Sheets

SENSOR FOR A HEADER HEIGHT CONTROL SYSTEM

FIELD OF THE INVENTION

The invention relates generally to agricultural combines. It relates in particular to header height control systems. More particularly it relates to sensors for indicating the height of a harvesting head for combine.

BACKGROUND OF THE INVENTION

Agricultural combines are typically equipped with a harvesting head that is disposed at the front of the vehicle to engage crop as the vehicle travels through the field, separate from the ground, and convey it to the threshing, separating, and cleaning systems within the combine vehicle itself.

One of the problems faced by agricultural combines is the necessity of keeping the harvesting head as close as possible to the ground in order to harvest as much of the crop as possible. At the same time, the harvesting head (if it is a corn head) should not be permitted to dig into the ground, or significant damage may result.

The solution to this problem has been the provision of a header height control system to sense the height of the header above the ground and to maintain the header at a constant height. This is done automatically as the vehicle travels through the field with the ground rising and falling underneath the header and the combine.

These systems were originally mechanical, and later mechanical-hydraulic. More recently, these systems have used electrical header height sensors that are connected to digital microprocessors. The digital microprocessors are programmed to receive height signals from the sensors and to control electrohydraulic valves that responsively raise and lower the harvesting head as appropriate.

One problem with these sensors is their ability to handle the rough treatment they receive. The sensors are typically contact sensors with one end attached to the header and the other end dragging over the ground. The combine and header often change direction, from forward to reverse to steering side-to-side. Furthermore, the header can be dropped flat against the ground, smashing the sensor between the header and the ground if no space is provided. All of this can cause severe damage unless the sensor is made large and strong enough (or small and flexible enough) to avoid injury.

U.S. Pat. No. 6,202,395 discloses a header height sensor that is mounted near the forward end of a row crop header point. "Points" are crop row separators designed to travel almost on the ground and to separate two adjacent rows of crop. The point separates the rows of crop the way the tine of a comb separates hair. The sensor is fixed to the underside of a point and includes a flexible sensor arm (40) that is attached to a rotation sensor (48) and has a ball (46) that engages the ground. The sensor arm is made flexible by providing a coil spring (42) as part of its length. In an alternative embodiment, the same flexible sensor arm is attached to a bracket (62) that is disposed between the flexible sensor arm (96) with coiled spring (98). It also has a ball (102) that engages the ground.

This arrangement suffers from several problems. The coil spring (42, 98) that makes the sensor arm (40, 96) flexible is prone to collect plant matter in its coils when it is flexed in a field. As a result it never returns to its original shape and no longer indicates the proper height above ground. Furthermore, the ball (46, 102) tends to gather dirt and plant matter due to its spherical shape. Even further, the ball, being symmetric, has no steering function and lets the lower portion of the arm be deflected left and right over the ground. This lateral deflection poses a particular problem since the shaft of the arm is flexible, and therefore can be bent easily when the ball at the end of the arm is deflected left and right by the soil. This leads to erroneous readings.

U.S. Pat. Nos. 6,883,299 and 7,310,931 are directed to a header height sensor that solves three identified problems. First, some headers do not have recesses for receiving sensors when the harvesting head is lowered to the ground. Second harvesting heads are operated closer to the ground than they were before and therefore provide little space between the bottom of the harvesting head and the ground in which the sensor can operate. Third, as the header gets closer to the ground it is beneficial to sense the height of the harvesting head farther forward, i.e. closer to the front of the harvesting head, thereby permitting the height controller to sense the height and correct the height sooner. To solve these problems, the device has a sensor arm with a special curvature that causes the ground contact point of the arm to move forward toward the front of the harvesting head as the harvesting head gets closer to the ground. The arm is thin and flexible with a tapered cross section so that it can be flattened between the flat ground and the flat bottom of the harvesting head. The arm is made of polyurethane to permit it to be severely bent without being damaged and to return to its original shape. The arm is so light that it requires a supplemental spring to hold the arm down against the ground.

The sensor arrangement of the '299 and '931 patents is suited to platform harvesting heads with flat bottoms that drag along the ground. The sensor arm of these patents avoids using the coil spring of the '395 patent for flexibility, but the resulting curved and flexible arm of the '299 patent is thin and easily damaged.

PURPOSE OF THE INVENTION

The purpose underlying this invention is seen in the need to provide a header height sensor that is accurate and rigid, and avoids the need for flexibility of the prior art arrangements.

SUMMARY OF THE INVENTION

The problem is solved according to the invention at least by the teaching of patent claim 1, where the further patent claims cite characteristics that further develop the solution to great advantage.

In accordance with a first aspect of the invention, a header height sensor for a harvesting head of an agricultural combine is provided, the header height sensor comprising an elongate sensor arm having an upper end that defines an aperture configured to receive a shaft and a lower end; a reversing joint that comprises a housing configured to receive the upper end of the elongate sensor arm; the housing including a mechanical stop to prevent movement of the elongate sensor arm 112) with respect to the housing in a first direction beyond the first limit of travel, the reversing joint further comprising a pair of springs disposed on either side of the upper end, the pair of springs being coupled to the housing and to the upper end to push the upper end against the mechanical stop, wherein the shaft extends through both springs and through the aperture in the elongate sensor arm, and is supported at a first end and at the second end on housing; a bracket configured to be fixed to plastic point, and being also configured to support an upper portion of the reversing joint for relative rotational movement about a laterally extending longitudinal axis; and
a rotary position sensor coupled to bracket 106 and coupled to reversing joint such that movement of the reversing joint with respect to the rotary position sensor causes an electrical signal from rotary position sensor to change as a function of the relative rotation.

The aperture is oblong to permit the sensor arm to move laterally at its lower end without breaking. The sensor arm may be rigid. The sensor arm may include a first beam member having the aperture, and a second beam member may be adjustably fixed to the first beam member to vary the overall length of the sensor arm 112. The first beam member may include ribs to stiffen the first beam member. The second beam member may be made of steel or cast-iron. The header height sensor may further include at least one removable fastener fastening the first beam member to the second beam member. The sensor arm may comprise a steel or iron weight to bias sensor arm downward against the ground. The header height sensor may further include a plastic point having a forward end with a metal tip 104 fixed thereto, and the header height sensor is fixed by the bracket 106 to the forward end. The plastic point may have a downwardly opening cavity 110 configured to receive the header height sensor without internal interference when the metal tip is on the ground. The sensor arm is not curved or flexible. The second beam member engages the ground during operation in the field and not the first beam member. The first beam member may have an elongate rigid U-shaped construction and is formed of plastic.

DETAILED DESCRIPTION OF THE PREFERRED EMBODIMENTS

Figure 1:
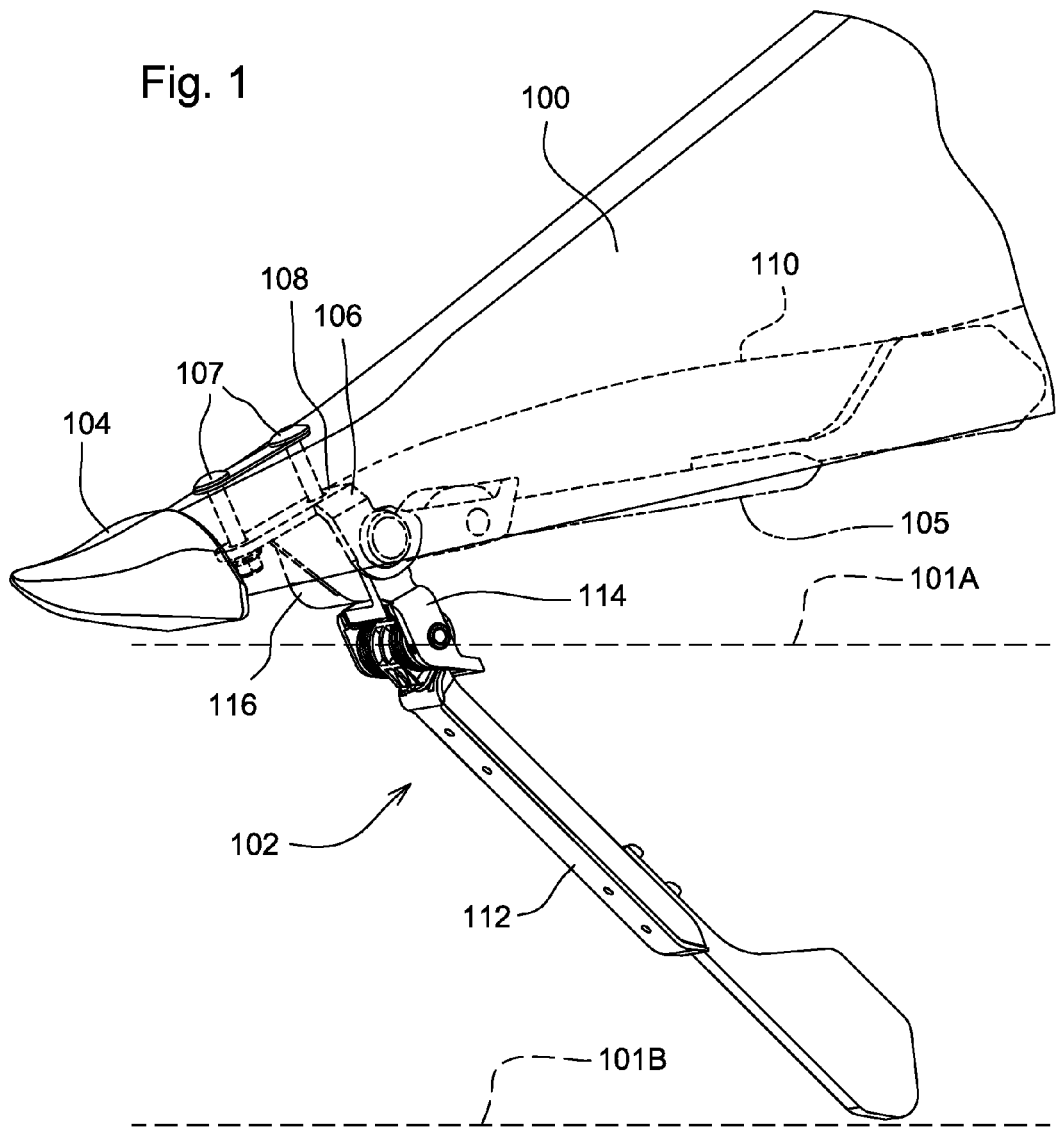
FIG. 1 illustrates a perspective view of a point of a corn head with the header height sensor in accordance with the present invention.

In FIG. 1, a plastic point 100 for a row crop harvesting head (a corn head) is illustrated together with a header height sensor 102 mounted to a forward end thereof. The plastic point 100 is typically made out of a rotomolded plastic, such as polyethylene or polypropylene.

A metal tip 104 is fixed to a forward end of the plastic point 100 to provide a wear surface for the plastic point 100 whenever it skids across the ground. Header height sensor 102 is fixed to plastic point 100 immediately behind metal tip 104. Header height sensor 102 includes a bracket 106 having a planar upper surface 108. This bracket 108 is fixed to a planar surface of plastic point 100 that faces downward and is formed in a downwardly opening cavity 110 inside plastic point 100.

Header height sensor 102 includes a rigid sensor arm 112 that is coupled to a reversing joint 114, which in turn is coupled to a position sensor 116 which is coupled to the bracket 108.

The sensor 102 first touches the ground when the ground is at the 101B level. As the harvesting head (and hence plastic point 100) is lowered, the header height sensor 102 pivots counterclockwise (as shown in FIG. 1) against the ground until the ground rises to the 101A level. At this point the header height sensor 102 is just beginning to be received in the cavity 110. The header and plastic point can go no further, however, since the metal tip 104 of plastic point 100 is touching the ground.

Even with the tip of the plastic point resting on the ground, however, the sensor arm 112 is not compressed between the harvesting head and the ground. The sensor arm 112 can still be freely rotated counterclockwise as shown by its uppermost position (illustrated in phantom lines). Sensor arm 112 is free to pivot between its uppermost position 105 to a lower position at which the rear end of the header height sensor arm 112 touches the ground at its highest level 101A. The sensor arm 112 can therefore be made quite stiff and rigid.

Figure 2:
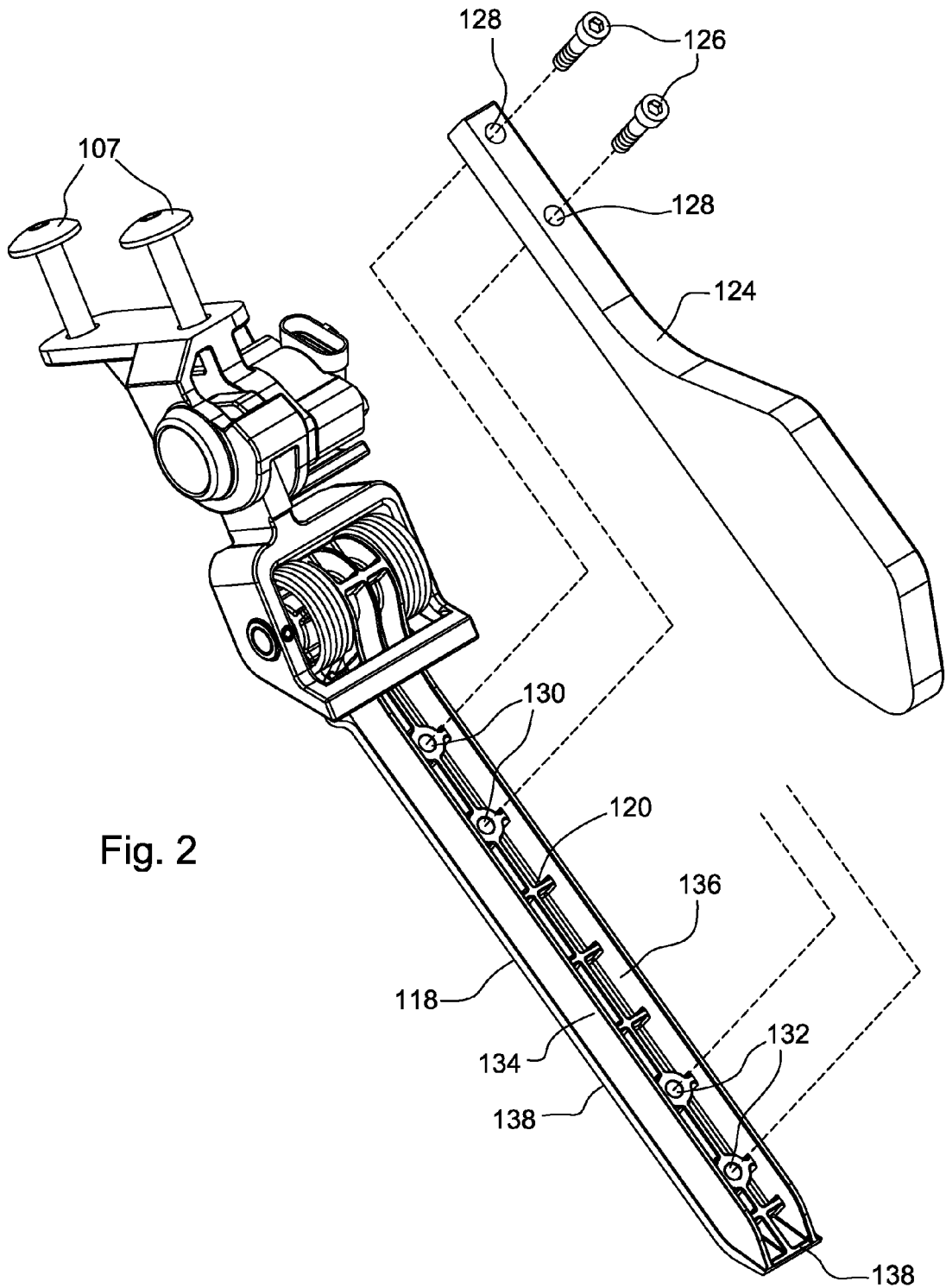
FIG. 2 is a partially exploded perspective view of the header height sensor of FIG. 1.

Referring now to FIG. 2, the upper half of rigid sensor arm 112 is formed as a first beam member 118 that has the form of an elongate straight U-shaped member with internal ribs 120. The lower half of sensor arm 112 is formed as a second beam member 122 which has the form of an irregular steel or iron plate 124.

The first and second beam members 118, 122 that form a part of sensor arm 112 are fixed to each other with threaded fasteners 126. Fasteners 126 extend through apertures 128 in an upper portion of second beam member 124.

Fasteners 126 are threaded into mating threads in apertures 130 in an upper portion of sensor arm 112. Fasteners 126 may be alternatively threaded into mating threads in apertures 132 in a lower portion of sensor arm 112.

Internal ribs 120 add stiffness and rigidity to first beam member 118. First beam member 118 also has two longitudinally extending sidewalls 134,136 that extend upward from a planar bottom sheet 138 to form the U-shape of the first beam member 118. This U-shape provided by the bottom sheet and two sidewalls further enhances the stiffness and rigidity of first beam member 118 and rigid sensor arm 112. The bottom sheet 138 is 4 mm thick by 27 mm wide. The sidewalls 134, 136 are 2.3 mm wide and extend 18 mm upward from the top of bottom sheet 138. The side walls are spaced apart with a gap of 16 mm therebetween to accommodate the 15.5 mm thickness of plate 124, which is inserted between the two sidewalls to the depth of the bottom sheet (if no ribs are provided) or to the top of any ribs 120 extending up from the bottom sheet.

The positions of the first and second beam members are arranged such that the second beam member engages the ground over the entire operating range of the header height sensor 102. The first and second beams cannot be flattened against the ground, nor need they be flattened, since the point is angled upward leaving a large open cavity 110 to receive the upper portion of header height sensor 102. The arm of the header height sensor is rigid. It cannot be flattened between the plastic point and the ground during operation.

The bottom of first beam member 118 is flat, not curved. As it is lowered to the ground its point of contact with the ground moves rearward, away from the front of the harvesting head and plastic point mounted thereon where it is better protected and less able to be snagged on plant stalks.

To make this rearward movement easier, the cavity 110 (FIG. 1) in the bottom of the plastic point is configured to receive sensor arm 112 without resistance and not to press sensor arm 112 against the ground. By avoiding ground deformation in this manner, it permits the sensor arm 112 to be made thicker, heavier, rigid, inflexible, and thus weighty enough to follow the ground without any additional downward biasing means.

Figure 3:
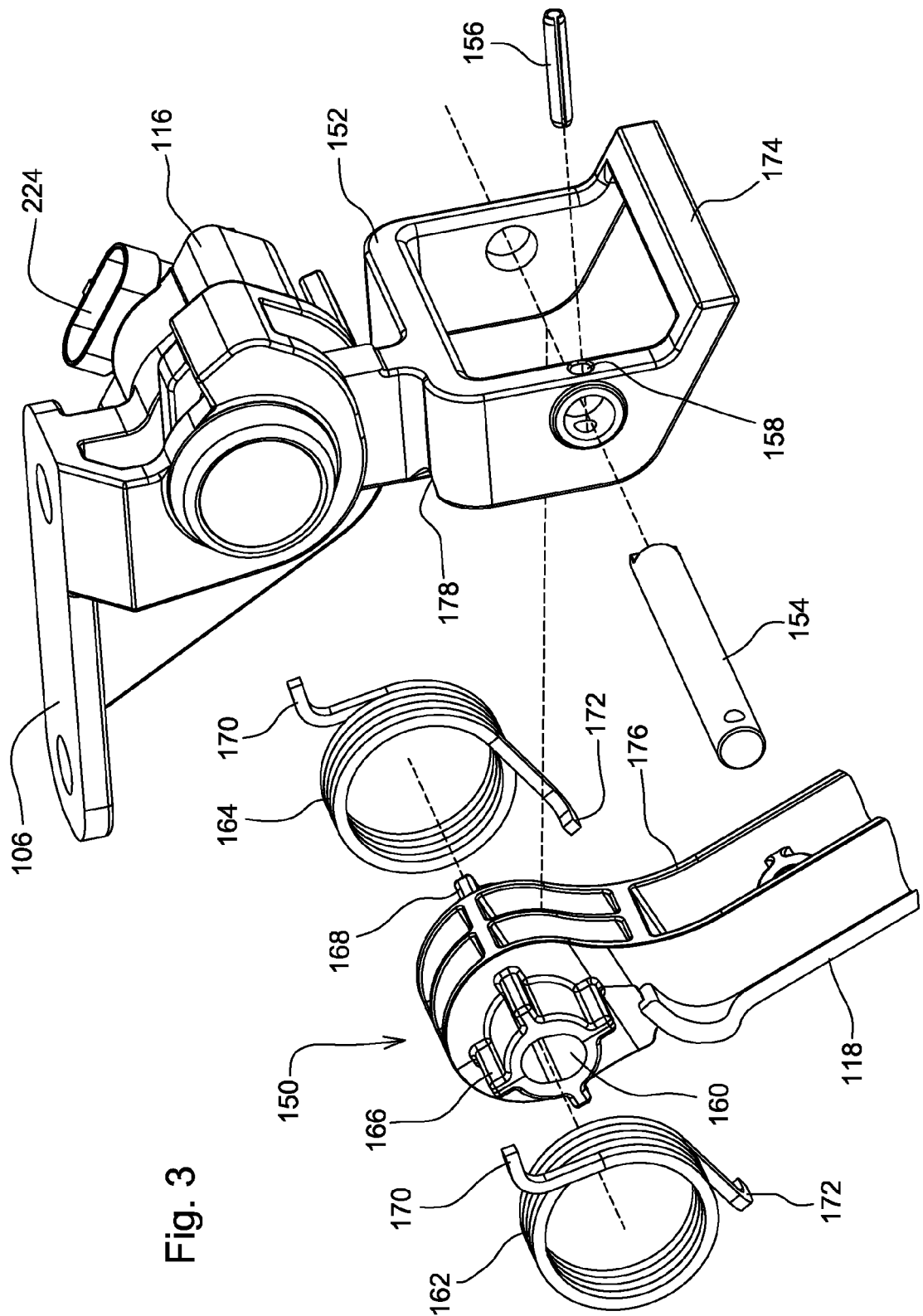
FIG. 3 is a partially exploded perspective view of the sensor element arrangement of the header height sensor of FIGS. 1-2.

Referring now to FIG. 3, the upper end 150 of first beam member 118 is supported in reversing joint 114 which comprises a housing 152 and associated elements that permit the lower end of sensor arm 112 to be rotated in the reverse direction (i.e. clockwise in FIG. 1) to relieve strain and prevent damage to header height sensor 102 when the sensor arm 112 is pulled in a clockwise direction (in FIG. 1) direction.

Housing 152 supports a shaft 154 at both ends. A spring pin 156 is inserted through an aperture 158 in housing 152 to hold shaft 154 in position, supported at each end by housing 152. Upper end 150 as an aperture 160 passing there through that is configured to receive shaft 154. This arrangement supports upper end 150 for pivotal movement about shaft 154 within the housing 152. Two coil springs 162, 164 are disposed on opposite sides of upper end 150. Springs 162, 164 are supported on spring supports 166, 168 that extend in a direction generally parallel to shaft 154 from opposite sides of upper end 150.

The dual springs and shaft supported at both ends with the upper ends 150 held therebetween is capable of resisting greater forces than the cantilevered shafts of the '395 patent.

Each coil spring 162, 164 has an upper spring end 170, and a lower spring end 172 that are configured to grip housing 152 and upper end 150, respectively, to apply a torque between housing 152 and upper end 150, thereby holding first beam member 118 in a predetermined position with respect to housing 152.

The predetermined position is determined by a mechanical stop 174 that extends across the rear of housing 152. Mechanical stop 174 provides an abutting surface for upper end 150.

When first beam member 118 is rotated in a counterclockwise direction (in FIG. 3) with respect to housing 152, a shank portion 176 of upper end 150 abuts mechanical stop 174 and prevents further counterclockwise rotation with respect to housing 152.

Each of the two coil springs 162, 164 hold upper end 150 in this predetermined abutted position with respect to housing 152. The upper spring ends 170 of the two coil springs 162, 164 abut housing 152. The lower spring ends 172 of the two coil springs 162, 164 abut shank portion 176. The two coil springs 162, 164 are placed in tension to ensure that shank 176 makes abutting contact with mechanical stop 174 during normal operation.

Under some operating conditions, such as when the agricultural combine stops and travels on a reverse direction, the lowermost end of sensor arm 112 can dig into the ground and be pulled forward as the ground moves forward underneath the harvesting head and the plastic point 100. When this happens, the clockwise torque (in FIG. 3) acting on the bottom of sensor arm 112 causes it to rotate clockwise with respect to housing 152, and to pull away from mechanical stop 174.

When this happens, the two coil springs 162, 164 are tightened by the movement of sensor arm 112 with respect to housing 152. The sensor arm rotates about shaft 154 which is pinned to housing 152 in order to permit this to happen. Furthermore, the aperture 160 of sensor arm 112 in which shaft 154 is received is made oblong in the direction of the longitudinal extent of first beam member 118. This permits the sensor arm to pivot slightly side to side (i.e. in a direction perpendicular to the forward or reverse direction of travel of the combine) as the first to be member 118 is pulled forward by the ground. This additional play permits the first beam member 118 to be deflected slightly side to side by the ground as the ground drags the sensor arm 112 forward, away from mechanical stop 174. This additional slack is beneficial by permitting sensor arm 112 to move from side to side without breaking.

Figure 4:
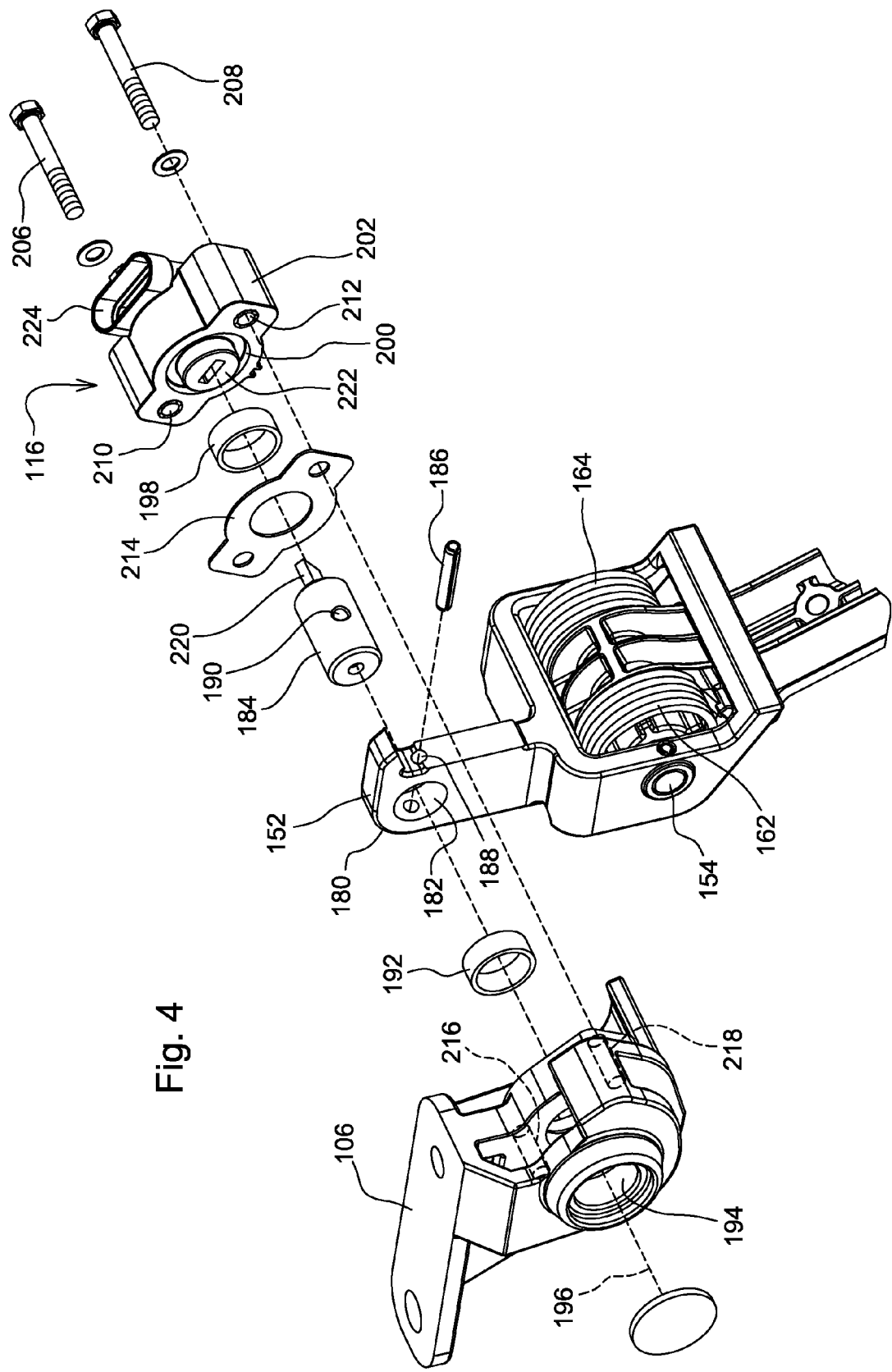
FIG. 4 is a partially exploded perspective view of a reversing joint of the header height sensor of FIGS. 1-3

Referring now to FIG. 4, housing 152 has a mount 180 that extends upward therefrom. Mount 180 is in the form of a planar member having a laterally extending aperture 182 passing therethrough. A shaft 184 extending laterally and generally parallel to shaft 154 is disposed within aperture 182 and is pinned in place with retaining pin 186. Retaining pin 186 extends through an aperture 188 in mount 180, and through an aligned aperture 190 in shaft 184. A bearing 192 in the form of a hollow cylinder or bushing extends about the left end (in FIG. 4) of shaft 184, and is in turn received in an aperture 194 in bracket 106. Aperture 194 also extends laterally with respect to plastic point 100. This arrangement permits housing 152 to rotate about longitudinal axis 196 that is the central axis of aperture 194, bearing 192, aperture 182, and shaft 184.

The other end of shaft 184 is supported on a bearing 198 made in the form of a hollow cylinder. Bearing 198 is supported in an aperture 200 that is formed in the body 202 of a rotary position sensor 116. Body 202 is bolted to bracket 106 with two threaded fasteners 206, 208 that extend through the pass-through clearance holes 210, 212, respectively, in body 202, through a gasket 214 that is disposed between bracket 106 and body 202, and thence into threaded holes 216, 218, respectively, that are formed in bracket 106. When tightened, fasteners 206, 208 compress gasket 214, and hold body 202 rigidly fixed to bracket 106. The right end (in FIG. 4) of shaft 184 also has an engagement member 220 that is configured to be received in rotary sensor element 222.

The tolerances between shaft 184, and bearings 192, 198, permit housing 152 to rotate about axis 196 with respect to bracket 106 and body 202 as the lower end of sensor arm 112 travels over the ground being raised and lowered as it follows fluctuations in the terrain. Whenever housing 152 rotates, it causes sensor element 222 to rotate an identical amount with respect to body 202 of rotary position sensor 116. This rotation causes the rotary position sensor 116 to generate a signal indicative of the position or the change in position of rotary sensor element 222 with respect to body 202. Since rotary sensor element 222 rotates identically with housing 152, the signal generated by rotary position sensor 116 indicates the rotation of housing 152, and therefore sensor arm 112 as well, with respect to bracket 106.

Thus, the signal provided by rotary position sensor 116 indicates the distance between plastic point 100 and the ground. An electrical connector 224 is provided on housing 202 to provide an electrical connection between the sensor elements disposed inside rotary position sensor 116 and an electronic header height control circuit disposed elsewhere on the harvesting head or on the agricultural combine itself.

The invention claimed is:

1. A header height sensor for a harvesting head of an agricultural combine, the header height sensor comprising:
an elongate sensor arm (112) having an upper end (150) that defines an aperture (160) configured to receive a shaft (154) and a lower end;
a reversing joint (114) that comprises a housing (152) configured to receive the upper end of the elongate sensor arm (112); the housing (152) including a mechanical stop (174) to prevent movement of the elongate sensor arm 112) with respect to the housing (152) in a first direction beyond the first limit of travel, the reversing joint (114) further comprising a pair of springs (162, 164) disposed on either side of the upper end (150), the pair of springs (162, 164) being coupled to the housing (152) and to the upper end (150) to push the upper end (150) against the mechanical stop (174), wherein the shaft (154) extends through both springs (162, 164) and through the aperture (160) in the elongate sensor arm (112), and is supported at a first end and at the second end on housing (152);

a bracket (106) configured to be fixed to a plastic point (100), and being also configured to support an upper portion of the reversing joint (114) for relative rotational movement about a laterally extending longitudinal axis (196); and a rotary position sensor (116) coupled to bracket 106 and coupled to reversing joint (114) such that movement of the reversing joint (114) with respect to the rotary position sensor (116) causes an electrical signal from rotary position sensor (116) to change as a function of the relative rotation.

2. The header height sensor of claim 1, where in the aperture (160) is oblong to permit the sensor arm (112) to move laterally at its lower end without breaking.

3. The header height sensor of claim 1, wherein the sensor arm (112) is rigid.

4. The header height sensor of claim 1, wherein the sensor arm (112) comprises a first beam member (118) having the aperture (160), and a second beam member (122) adjustably fixed to the first beam member (118) to vary the overall length of the sensor arm 112.

5. The header height sensor of claim 4, wherein the first beam member (118) includes ribs to stiffen the first beam member (118).

6. The header height sensor of claim 4, wherein the second beam member is comprised of steel or cast-iron.

7. The header height sensor of claim 4, further comprising at least one removable fastener fastening the first beam member (118) to the second beam member (122).

8. The header height sensor of claim 1, where in the sensor arm (112) comprises a steel or iron weight to bias sensor arm (112) downward against the ground.

9. The header height sensor of claim 1, further comprising the plastic point having a forward end with a metal tip 104 fixed thereto, wherein the header height sensor is fixed by the bracket 106 to the forward end.

10. The header height sensor of claim 9, wherein the plastic point has a downwardly opening cavity 110 configured to receive the header height sensor without internal interference when the metal tip is on the ground.

11. The header height sensor of claim 1, wherein the sensor arm is not curved or flexible.

12. The header height sensor of claim 4, wherein the second beam member engages the ground during operation in the field and not the first beam member.

13. The header height sensor of claim 4, wherein the first beam member has an elongate rigid U-shaped construction and is formed of plastic.

\* \* \* \* \*